(12) United States Patent
McCusker

(10) Patent No.: US 7,908,045 B1
(45) Date of Patent: Mar. 15, 2011

(54) SYSTEM AND METHOD FOR PRESENTING AN IMAGE OF TERRAIN ON AN AIRCRAFT DISPLAY UNIT

(75) Inventor: Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 702 days.

(21) Appl. No.: 11/904,484

(22) Filed: Sep. 27, 2007

(51) Int. Cl.
*G01C 5/00* (2006.01)
*G01C 21/30* (2006.01)
*G08B 23/00* (2006.01)
*G05D 1/08* (2006.01)

(52) U.S. Cl. .............. 701/9; 701/208; 340/970; 244/180
(58) Field of Classification Search .................. 701/208, 701/1, 3, 4, 5, 16, 18, 100, 120, 207, 209, 701/213, 300–302; 73/1.57, 112.04, 178 T; 340/945, 963, 964, 970, 971, 977
See application file for complete search history.

(56) References Cited

U.S. PATENT DOCUMENTS

| | | | |
|---|---|---|---|
| 4,914,436 A | 4/1990 | Bateman et al. | |
| 5,839,080 A | 11/1998 | Muller et al. | |
| 6,088,634 A * | 7/2000 | Muller et al. | 701/9 |
| 6,092,009 A | 7/2000 | Glover | |
| 6,122,570 A * | 9/2000 | Muller et al. | 701/9 |
| 6,138,060 A * | 10/2000 | Conner et al. | 701/9 |
| 6,219,592 B1 | 4/2001 | Muller et al. | |
| 6,292,721 B1 * | 9/2001 | Conner et al. | 701/9 |
| 7,126,534 B2 * | 10/2006 | Smith et al. | 342/456 |
| 7,145,501 B1 | 12/2006 | Manfred et al. | |
| 2004/0183695 A1 * | 9/2004 | Ruokangas et al. | 340/945 |

* cited by examiner

*Primary Examiner* — Jack Keith
*Assistant Examiner* — Muhammad Shafi
(74) *Attorney, Agent, or Firm* — Matthew J. Evans; Daniel M. Barbieri

(57) ABSTRACT

A system and method for presenting an image of terrain threats are disclosed. Substantially transparent terrain symbols (color or monochrome) are depicted where each symbol is representative of a level of threat. Terrain symbols may overlay a weather image without a loss in information. A system is disclosed which comprises a navigation system, a terrain database, an image processor, and an indicating system. The navigation system acquires navigation data representative of aircraft position and direction; the database stores data of a plurality of cells; and the indicating system receives image data and presents symbols representative of the terrain image. The image processor receives navigation data defines a range of elevations of threat levels based upon the aircraft altitude, receives terrain data from the terrain database, determines the terrain threat of each cell, and provides an image representing the threat level and locations to the display.

18 Claims, 7 Drawing Sheets

150 — First Level of Terrain Threat (Red)

152 — Second Level of Terrain Threat (Yellow)

154 — Third Level of Terrain Threat (Green)

| 160 | R | First Level of Terrain Threat (Red) |
| 162 | Y | Second Level of Terrain Threat (Yellow) |
| 164 | G | Third Level of Terrain Threat (Green) |

| | | |
|---|---|---|
| 170 |  | First Level of Terrain Threat |
| 172 |  | Second Level of Terrain Threat |
| 174 |  | Third Level of Terrain Threat |

| | | |
|---|---|---|
| 170 |  | First Level of Terrain Threat |
| 172 |  | Second Level of Terrain Threat |
| 174 |  | Third Level of Terrain Threat |

SYSTEM AND METHOD FOR PRESENTING AN IMAGE OF TERRAIN ON AN AIRCRAFT DISPLAY UNIT

BACKGROUND OF THE INVENTION

1. Field of the Invention

This invention pertains to the field of cockpit indicators or display units that provide terrain information to pilot or flight crew of an aircraft.

2. Description of the Related Art

Beginning in the early 1970's, a number of studies looked at the occurrence of "controlled flight into terrain" (CFIT)-type accidents, where a properly functioning airplane under the control of a fully qualified and certificated crew is flown into terrain (or water or obstacles) with no apparent awareness on the part of the crew. Findings from these studies indicated that many such accidents could have been avoided if a warning device called a ground proximity warning system ("GPWS") was used. There have been numerous patents issued in the field of GPWS and related art. A sampling of patents issued in the art and related art include U.S. Pat. Nos. 5,839,080; 6,092,009; 6,122,570; 6,138,060; 6,219,592; and 7,145,501.

Advances in technology have permitted vendors and designers of avionics equipment to develop newer type of GPWS that provides greater situational awareness for flight crews. The U.S. Federal Aviation Administration ("FAA") has classified such systems as Terrain Awareness and Warning Systems ("TAWS"). The advancement of technologies—more precise navigation systems, increased computer memory storage, and better display technology—have allowed further development of in the common features of TAWS: (1) use of airplane position information from the aircraft's navigation system(s), (2) an onboard terrain database, and (3) a means of displaying the surrounding terrain. Aircraft position information from the aircraft's navigation system is fed to a TAWS computer. The TAWS computer compares the airplane's current position and flight path with the terrain database associated with the system. If there is a potential threat of collision with terrain, the TAWS computer sends warning alerts to the airplane's audio system.

Manufactures have produced cockpit indicators for presenting terrain information to the pilot. For instance terrain information may be depicted in three colors (e.g., red, yellow, and green) and variable density dot patterns. Each of the colors and patterns, such as those discussed in U.S. Pat. No. 6,122,570, could indicate a different level of terrain threat in front of the aircraft. For example, a high density dot pattern that could be associated with a first level of terrain threat may be defined as a function of the altitude. A high density dot pattern could be associated with a color such as red, a color traditionally associated with a warning alert of TAWS. Likewise, medium and low density dot patterns that could be associated with second and third levels of terrain threat, respectively, may be defined as a function of the altitude. Medium and low density dot patterns could be associated with different colors such as amber and green, where amber is a color traditionally associated with a caution alert of TAWS.

Although these traditional terrain indicators present terrain information to a pilot, they tend to obscure or clutter the presentation of information that may interfere with other functions display on the indicator. In addition, other systems share the same colors as used in terrain indicating systems. For example, a weather radar system may also use the colors red and yellow in depicting weather information. If so, then a pilot may be limited to viewing either weather or terrain information at one time and not both simultaneously. The embodiments disclosed herein present novel and non-trivial system and method for presenting an image of terrain on a display unit of an aircraft.

BRIEF SUMMARY OF THE INVENTION

The embodiments disclosed herein present novel and non-trivial system and method for presenting an image of terrain on a display unit of an aircraft. A system comprises a navigation system, a terrain database, a terrain image processor, and an indicating system. The navigation system acquires navigation data representative of aircraft position, altitude, and direction of light; the terrain database stores terrain data of a plurality of terrain cells; and the indicating system receives terrain image data and presents terrain substantially transparent symbols representative of the terrain image generated by the terrain image processor.

In one embodiment, the terrain image processor receives navigation data from the navigation system, defines a range of terrain elevations of one or more terrain threat levels based upon the aircraft altitude, receives terrain data from the terrain database, determines the terrain threat of each terrain cell, and provides an image data representing the terrain threat level and locations to the terrain indicating system.

In another embodiment, a method for presenting an image of terrain on a display unit of an aircraft is disclosed. Navigation data is received, a range of terrain elevations are defined corresponding to levels of terrain threats and the aircraft altitude, terrain data is received for terrain cells corresponding to the levels of terrain, the threat levels and locations of the terrain cells are determined, and terrain image data representative of the threat and location of each terrain cell is provided to the terrain indicating system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
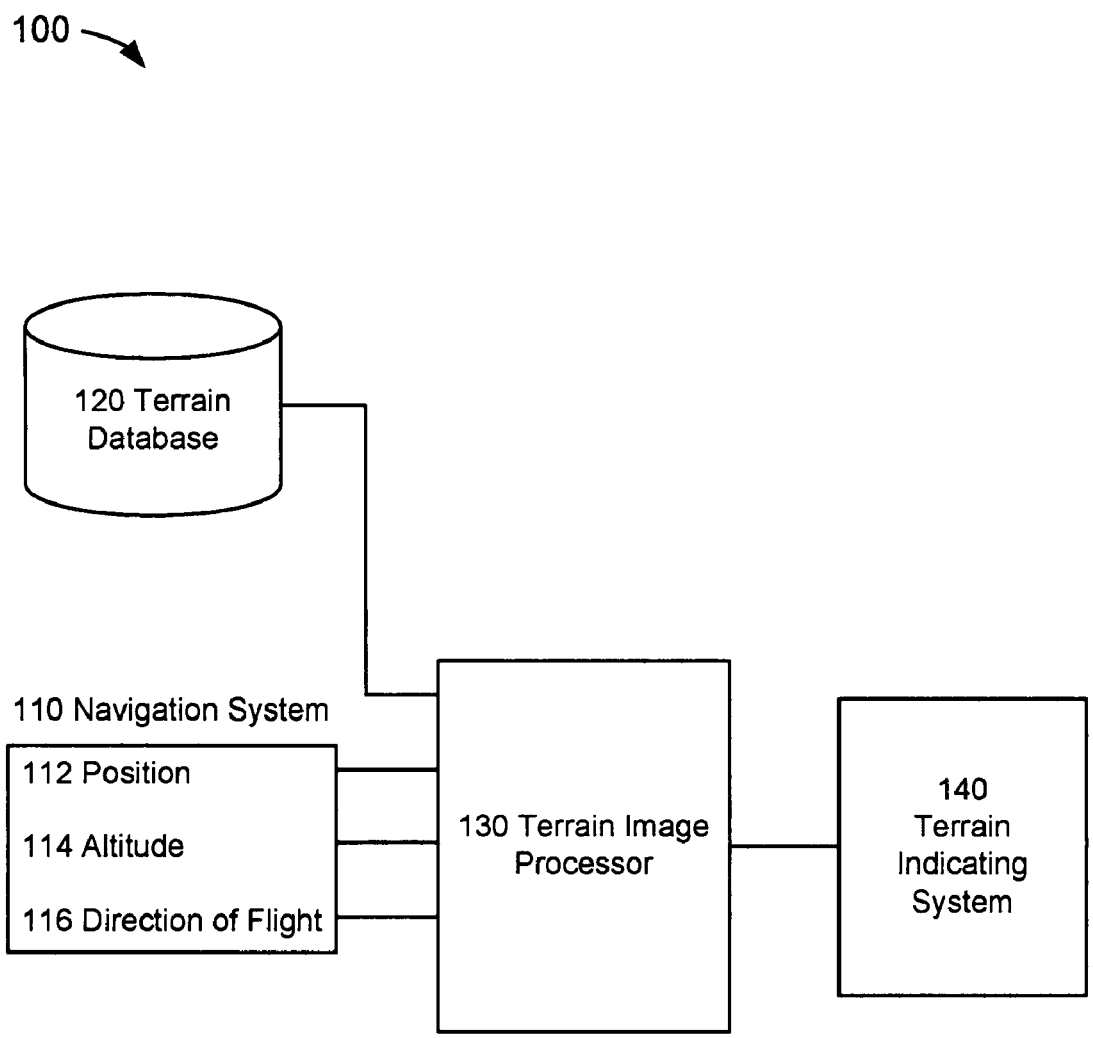
FIG. 1 depicts a block diagram of a system for presenting an image of terrain on a display unit of an aircraft.

FIG. 1 depicts an image display system 100 suitable for implementation of the techniques described herein. The system may be comprised of a navigation system 110, terrain database 120, terrain image processor 130, and a terrain indicating system 140.

A navigation system 110 includes those systems that provide navigation data information to the pilot. A navigation system 110 may include, but is not limited to an air/data system, attitude heading reference system, an inertial guidance system (or inertial reference system), global navigation satellite system (or satellite navigation system), and flight management computing system, of all which are known to those skilled in the art. As embodied herein, a navigation system 110 could provide navigation data including, but not limited to, aircraft position 112, altitude 114, and direction of flight 116 to a terrain image processor 130 for subsequent processing as discussed herein. In an alternative embodiment, direction of flight data could be acquired from data representative of aircraft heading or ground track.

A terrain database 120 may be used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a square cell defined in arc-minutes of latitude and longitude, or a grid may be circular. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set by an approximately ratio of 900:1. At the present time, resolutions of one-arc second for SRTM terrain data are available for areas over the United States; for all other locations, resolutions of three arc-seconds (approx. 90 meters) are available. In addition to these public sources of terrain data, various vendors and designers of avionics equipment have developed databases that have been, for all intents and purposes, proprietary in nature. Typically, data contained in a terrain data cell may include the value of the highest elevation found within the cell.

A terrain image processor 130 may receive input data from various systems including, but not limited to, a navigation system 110 and a terrain database 120 for processing as discussed herein. A terrain image processor 130 may be electronically coupled to a navigation system 110 and a terrain database 120 to facilitate the receipt of input data. It is not necessary that a direct connection be made; instead, such receipt of input data could be provided through a data bus or through a wireless network.

A terrain image processor 130 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A terrain alerting processor 150 may be driven by the execution of software or source code containing algorithms developed for the specific functions embodied herein. Common examples of an electronic data processing unit include microprocessors and signal processors; however, for the embodiments herein, the term processor is not limited to the microprocessor and its meaning is not intended to be construed narrowly. For instance, a terrain alerting processor 150 could also consist of more than one electronic data processing units.

A terrain indicating system 140 could include any system that provides terrain information to the pilot or be shared with other aircraft systems that provide flight and system information on an indicator or display unit including, but are not limited to, a strategic display unit system. Such display from multiple sources could be the result of overlaying, a presentation technique known to those skilled in the art. A strategic display system could be a system which presents information to the crew relative to the intended future state(s) of the aircraft (e.g. intended location in space at specified times) along with information providing contextual information the crew (e.g. terrain, navigation aids, geopolitical boundaries, airspace boundaries, etc.) about such state(s). One example of such display unit is commonly referred to as a Navigation Display. In some configurations, the strategic display unit could be part of an Electronic Flight Information System ("EFIS"). On these systems, terrain information may be displayed simultaneously with information of other systems. In one embodiment herein, terrain information may be displayed simultaneously with weather information with no loss or a negligible loss of displayed information.

A terrain indicating system 140 may receive input data from various systems including, but not limited to, terrain indicating system 140 for processing as discussed herein. A terrain indicating system 140 may be electronically coupled to a terrain alerting processor 150 to facilitate the receipt of input data. It is not necessary that a direct connection be made; instead, such receipt of input data could be provided through a data bus or through a wireless network.

Figure 2:
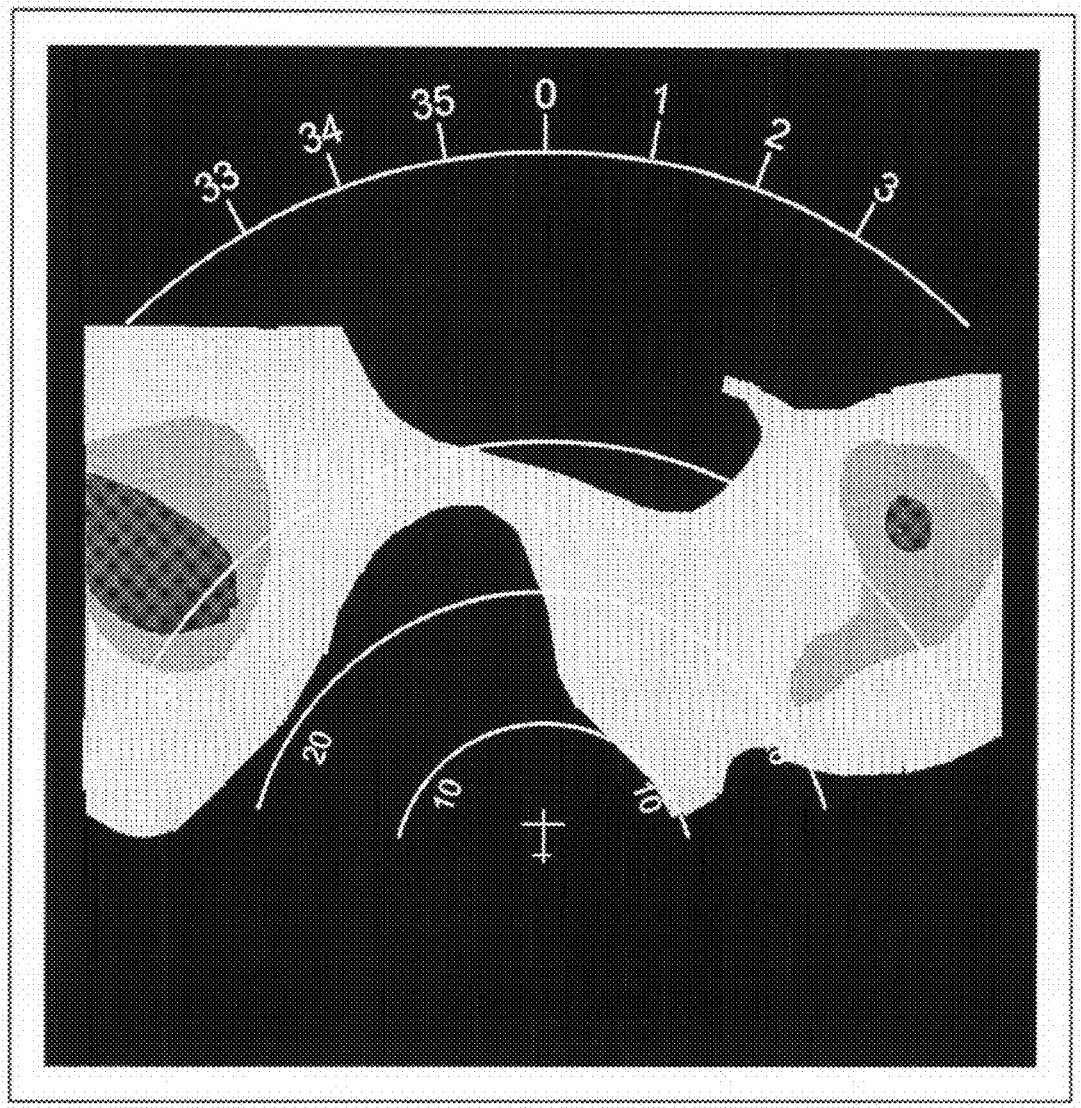
FIG. 2 depicts an exemplary illustration of a terrain display.

FIG. 2 provides an exemplar depiction of a strategic display unit presenting terrain information. As a preliminary matter, the strategic display unit could display an extensive amount of information to the pilot, information that could be provided from a plurality of aircraft systems. It should be noted that the extensiveness of this information has been intentionally omitted from the strategic display unit shown in FIG. 2 for the sake of the presentation only and discussion that follows herein. The omission of a plurality of indications or information is not indicative of the plurality of indications or information with which the presentation of terrain information disclosed herein may be configured, nor is it intended to be a limitation of the embodiments disclosed herein.

The terrain information of FIG. 2 is depicted in three colors (red, yellow, and green) and variable density dot patterns. Each of the colors and patterns, such as those discussed in U.S. Pat. No. 6,122,570, could indicate a different level of terrain threat in front of the aircraft. For example, item 150 indicates a high density dot pattern that could be associated with a first level of terrain threat which may be defined as a function of the altitude, e.g., terrain that is more than 2000 feet above the current altitude of an aircraft. High density dot pattern 150 could be associated with a color, and in this illustration, the color red. Likewise, items 152 and 154 indicate medium and low density dot patterns that could be associated with second and third levels of terrain threat, respectively, may be defined as a function of the altitude. For example, medium density dot pattern 152 could indicate terrain that is between 500 feet below and 2000 feet above the current altitude of the aircraft, and low density dot patterns could indicate terrain that is 2000 feet below to 500 feet below the current altitude. Medium and low density dot patterns 152 and 154 could be associated with different colors, and in this illustration, the colors yellow and green, respectively. The preceding examples of colors, density dot patterns, altitudes, and number of terrain threat levels are provided as illustrations and not limitations. The selection of altitude boundaries, density dot patterns, colors, and number of terrain threat levels that could be displayed may be specified or defined differently by each user.

Figure 3:
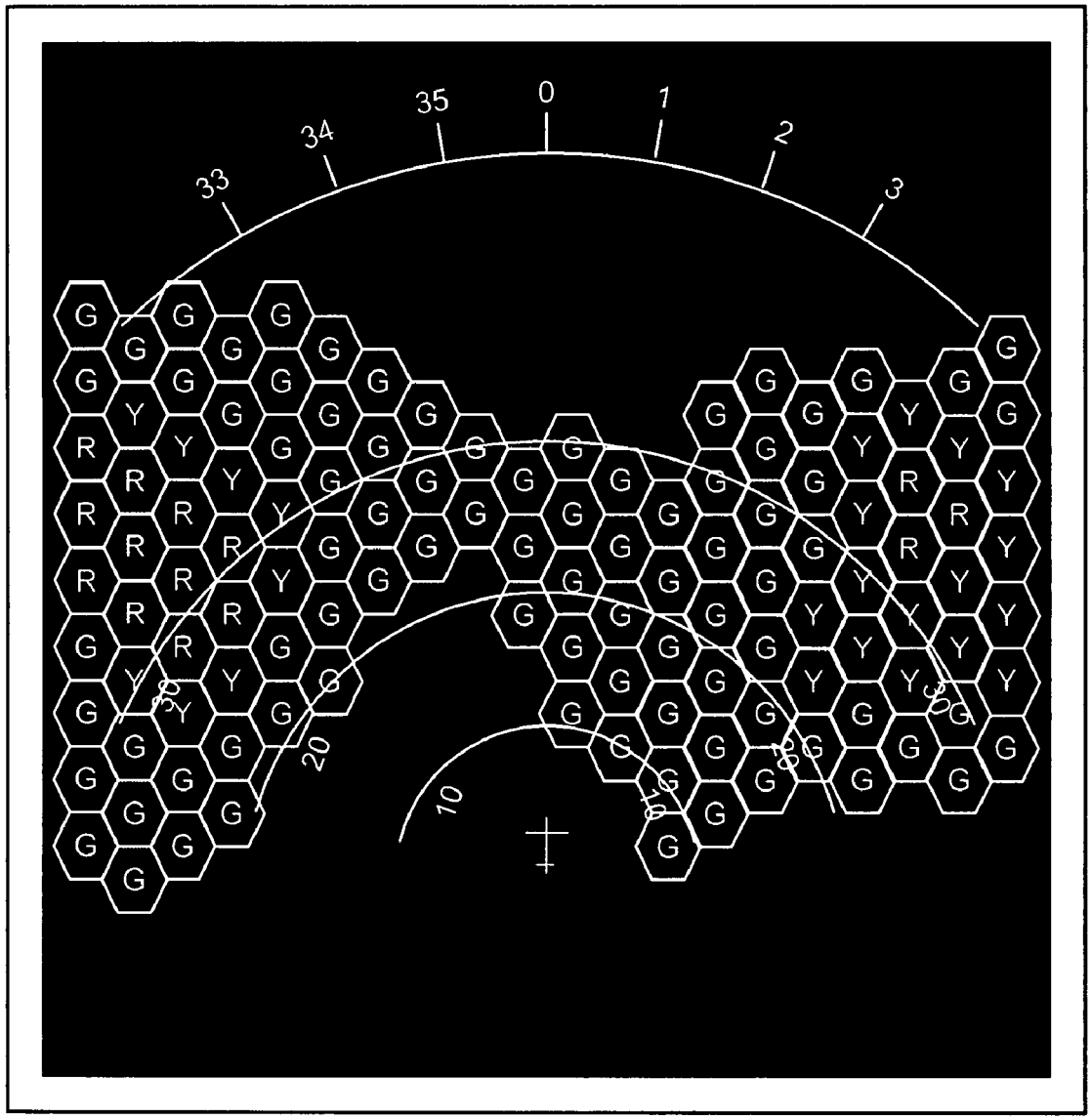
FIG. 3 depicts an exemplary illustration of terrain symbols being depicted on a strategic display unit.

As shown in FIG. 3, distance and relative bearing information to the terrain may be presented. The three lower arcs (shown as solid lines labeled 10, 20, and 30) may indicate reference distances of 10, 20, and 30 nautical miles relative to the aircraft's position, respectively, providing the pilot with a reference from which he or she may estimate the distance to the terrain presented on the display unit. The upper compass arc may indicate the heading of the aircraft, providing the pilot with a reference from which he or she may estimate the relative bearing to the terrain presented on the display unit.

The advantages and benefits of the embodiments discussed herein may be illustrated by showing examples of the information displayed on display units. FIGS. 3 through 6 herein provide exemplar depictions of terrain information displayed on a strategic unit display. For the purposes of illustration, the terrain data corresponding to the terrain depiction of FIG. 2 is the same for FIGS. 3 through 6. The depictions in FIGS. 3 through 6 are presented for the purposes of illustration only and are not provided as a limitation. It should be noted that a great deal of navigation information which may be depicted on the strategic display unit shown in FIGS. 3 through 6 has been intentionally omitted for the sake of the presentation only and discussion that follows herein. The omission of the plurality of indications or information is not indicative of the plurality of indications or information with which the presentation of terrain information disclosed herein may be configured nor is it intended to be a limitation of the embodiments disclosed herein.

FIG. 3 provides an exemplar depiction of terrain information displayed on a color strategic unit display. Items 160, 162, and 164 indicate terrain symbols of different colors where each color may be associated with a different level of terrain threat. A terrain symbol may be transparent to avoid interfering with other symbols that may be presented on the display such as, but not limited to, symbols associated with weather and navigational information. In one embodiment, any closed figure may be used as a terrain symbol such as, but not limited to, a polygon or a user-defined shaped. For the purposes of illustration herein, transparent hexagons have been selected as terrain symbols because the number of pixels needed to render adjoining cells is minimal.

In the illustration of FIG. 3, terrain symbols 160, 162, and 164 demonstrate the use color coding to indicate a different level of terrain threat in front of the aircraft. The letters "R", "Y", and "G" indicate the color of the borders—red, yellow, and green—for terrain symbols 160, 162, and 164, respectively. These letters are presented in FIG. 3 for the sake of discussion to show the colors of the borders only; in normal operation, these letters would not be presented on the strategic display unit because the border colors would actually be presented in color on the strategic display unit.

The use of colors may indicate the different levels of terrain threats. For example, terrain symbol 160 indicates that a red border could be associated with a first level of terrain threat which may be defined as a function of the altitude, e.g., terrain that is more than 2000 feet above the current altitude of an aircraft. Likewise, terrain symbols 162 and 164 indicate that yellow and green borders could be associated with second and third levels of terrain threat, respectively. For example, yellow could indicate terrain that is between 500 feet below and 2000 feet above the current altitude of the aircraft, and green could indicate terrain that is 2000 feet below to 500 feet below the current altitude. The preceding examples of colors, altitudes, and number of terrain threat levels are provided as illustrations and not limitations. In one embodiment, one or a plurality terrain threats may be displayed. In another embodiment, either one or a plurality of colors may be displayed where each color may correspond to a level of terrain threat. In another embodiment, the selection of the range of altitude which corresponds to a level of terrain threat may be any value or values selected by the user.

As shown in FIG. 3, distance and relative bearing information to the terrain relative to the aircraft's position is presented providing the pilot with a reference from which he or she may estimate the distance and relative bearing to the terrain presented on the strategic display unit. The three lower arcs (shown as solid lines labeled 10, 20, and 30) may indicate reference distances of 10, 20, and 30 nautical miles relative to the aircraft's position, respectively, providing the pilot with a reference from which he or she may estimate the distance to the terrain presented on the display unit. The upper compass arc may indicate the heading of the aircraft, providing the pilot with a reference from which he or she may estimate the relative bearing to the terrain presented on the display unit. As displayed by the strategic display unit of FIG. 3, a group of eleven terrain symbols with red borders informs the pilot that a first level of terrain threat exists approximately 65-75 degrees to the left at an approximate distance of 28 nautical miles. Similarly, a group of three terrain symbols with red borders informs the pilot that a first level of terrain threat exists approximately 60 degrees to the right at an approximate distance of 32 nautical miles. In a similar manner, the pilot is informed by terrain symbols with yellow and green borders that a second and third level of terrain threats exists from which he or she may estimate the distance and relative bearing to the terrain displayed on the strategic display unit of FIG. 3.

Figure 4:
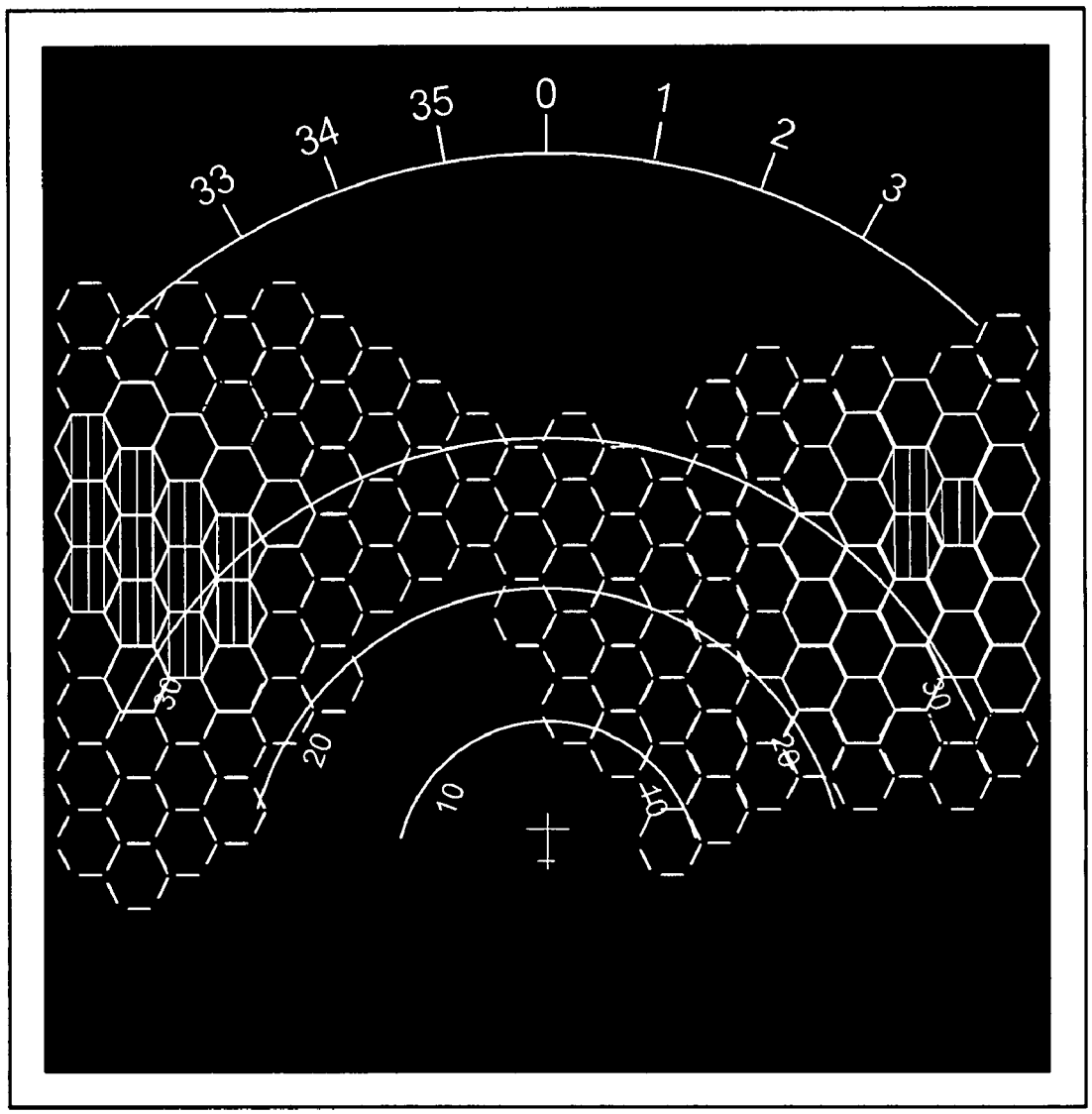
FIG. 4 depicts an exemplary illustration of terrain symbols being depicted on a strategic display unit.
Figure 4:
Figure 4:
Figure 4:

FIG. 4 provides an exemplar depiction of terrain information displayed on either a color or monochrome strategic unit display. Items 170, 172, and 174 provide alternative embodiments of terrain symbols. In one embodiment, border lines which delineate the terrain symbol may differ; for example, border lines may be solid, dashed, dotted, or any combination of these. In another embodiment, a terrain symbol may be sparingly filled; for example, the terrain symbol may be filled with vertical, horizontal, or diagonal lines in a manner which retains substantial transparency. In another embodiment, these alternative terrain symbols may be displayed in color or in monochrome.

The use of these embodied terrain symbols of the preceding paragraph may indicate the different levels of terrain threats. For example, terrain symbol 170 has a solid line border and vertical lines fill could be associated with a first level of terrain threat which may be defined as a function of the altitude, e.g., terrain that is more than 2000 feet above the current altitude of an aircraft. Likewise, terrain symbol 172 has a solid line border that could be associated with second level of terrain threat, e.g., terrain that is between 500 feet below and 2000 feet above the current altitude of the aircraft, and terrain symbol 174 has a dashed line border that could be associated with a third level of terrain threat, e.g., terrain that is 2000 feet below to 500 feet below the current altitude. The preceding examples of terrain symbol borders and fills, altitudes, and number of terrain threat levels are provided as illustrations and not limitations. In one embodiment, one or more levels of terrain threat may be displayed. In another embodiment, one or more borders, fills, or combination of both may be displayed representing a level of terrain threat. In another embodiment, the selection of the range of altitude which corresponds to a level of terrain threat may be any value or values determined by the user.

As displayed by the strategic display unit of FIG. 4, a group of eleven terrain symbols with solid borders and vertical lines informs the pilot that a first level of terrain threat exists approximately 65-75 degrees to the left at an approximate distance of 28 nautical miles. Similarly, a group of three terrain symbols with solid borders and vertical lines informs the pilot that a first level of terrain threat exists approximately 60 degrees to the right at an approximate distance of 32 nautical miles. In a similar manner, the pilot is informed by terrain symbols with solid and dashed borders that a second and third level of terrain threats exists from which he or she may estimate the distance and relative bearing to the terrain displayed on the strategic display unit of FIG. 4.

Figure 5:
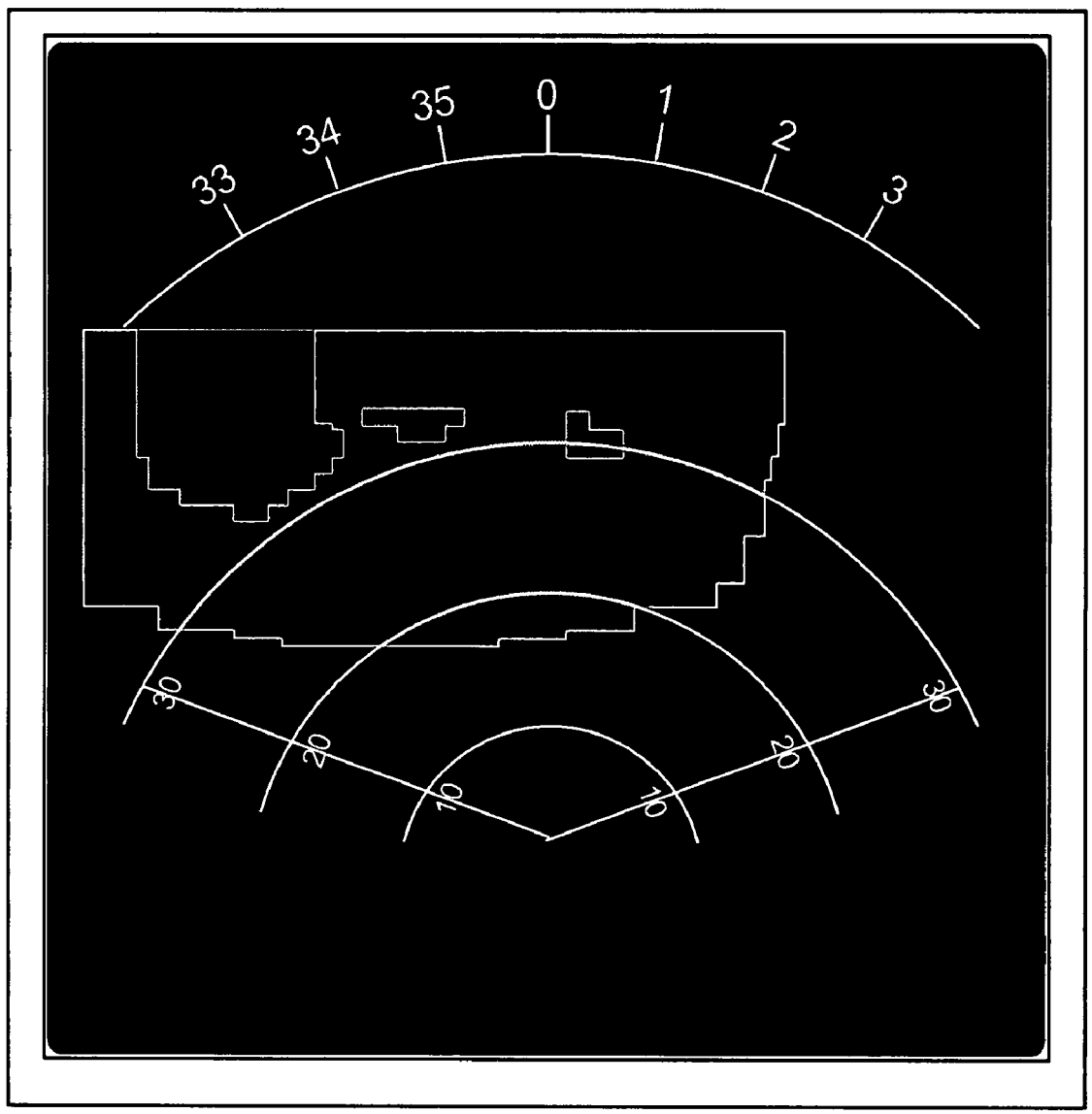
FIG. 5 depicts an exemplary illustration of weather display unit.

FIG. 5 provides an exemplary depiction of weather information on a strategic display unit. Typically, weather radar systems display weather condition information on a display unit using various colors such as red, yellow, and green. Because these colors may be the same used to indicate different levels of terrain threat, a simultaneous display of weather and terrain information could present an unsafe operation to the pilot of the aircraft by blending together the colors. To overcome this limitation of simultaneous display with the potential loss of either weather or terrain information, the embodied terrain symbols of FIG. 4 may be used to provide terrain information without a loss in weather information.

Figure 6:
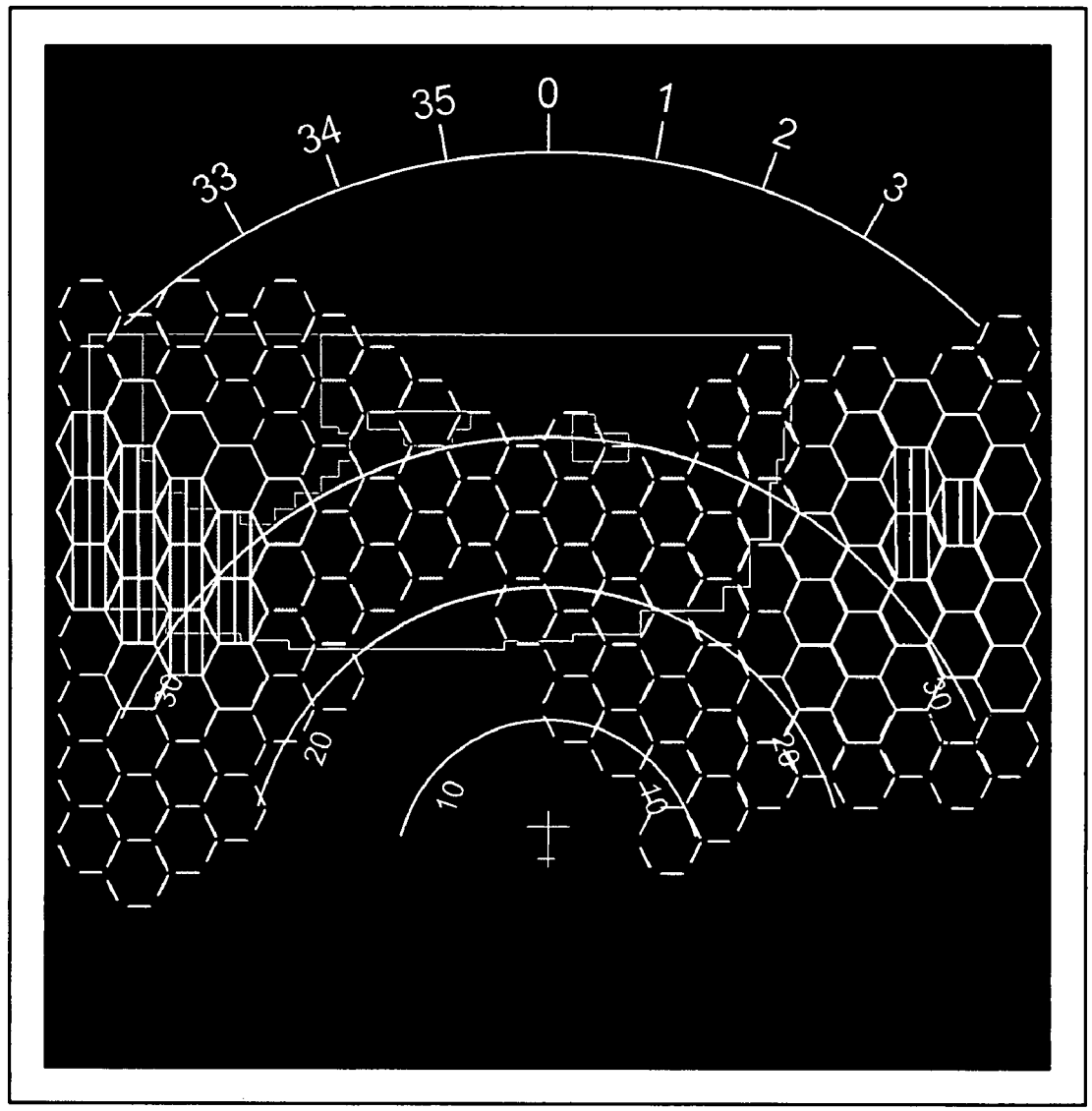
FIG. 6 depicts an exemplary illustration terrain symbols being simultaneously depicted with weather information on a strategic display unit.
Figure 6:
Figure 6:
Figure 6:

FIG. 6 provides an exemplar depiction showing terrain information of the embodiments of FIG. 4 that could be displayed simultaneously with weather radar information on a strategic unit display of FIG. 5. Terrain symbols may overlay weather information on a strategic unit display, and as such, provide the pilot with simultaneous weather and terrain information. The technique of overlaying information is well-known to those skilled in the art.

Figure 7:
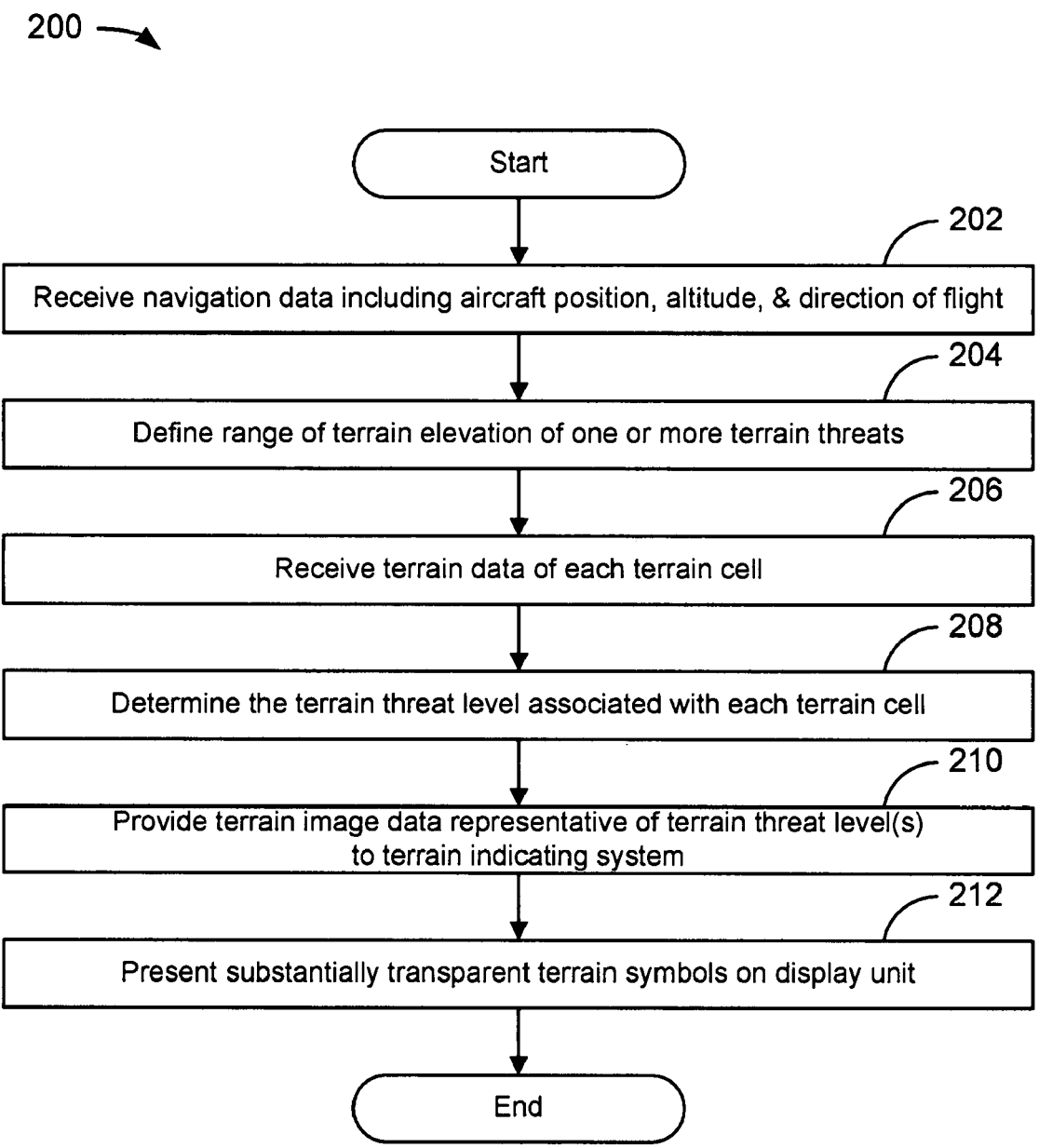
FIG. 7 provides a flowchart illustrating a method for controlling an image displayed on a display unit.

FIG. 7 depicts a flowchart 200 of an example of a method of displaying an image of terrain on a display unit of an aircraft. The flowchart begins with module 202 with the receiving of navigation data including aircraft position 112, altitude 114, and direction of flight 116 aircraft in flight. The navigation data could be provided by a navigation system 110. The flowchart continues with module 204 with the defining a range of terrain elevations of one or more terrain threat levels based upon the aircraft altitude 114, wherein each terrain threat level is associated with a range of altitudes. In one embodiment, the number or quantity of ranges of altitudes is configurable by the user. In another embodiment, the range of terrain elevations is configurable by a user. The range of altitudes could be written into the software being executed a terrain image processor 130 or could be stored in a database and retrieved by the terrain image processor 130. Those skilled in the art will appreciate the ability and ease with which executable software code may be reprogrammed or modified to facilitate a reconfiguration of a range in altitudes by a user without affecting or expanding the scope of the embodiments discussed herein. In another embodiment, the range of altitudes may be configurable by a selection being made by a pilot.

The flowchart continues with module 206 with the receiving terrain data of each terrain cell corresponding to a location of terrain in front of the aircraft in which the value of the highest elevation falls within any of the range of elevations. A terrain database 120 could populate a plurality of terrain cells, each having a values of the highest elevation found within the cell. In an embodiment, a terrain image processor 130 could retrieve the terrain data in which the value of the highest elevation falls within any of the range of elevations. In another embodiment, a terrain image processor 130 could retrieve terrain data of each terrain cell corresponding to a location of terrain in front of the aircraft, and then determine which of the terrain cells fall within the range of elevations. The location of the terrain in front of the aircraft could be based on the aircraft position 112 and direction of flight 116. In another embodiment, the aircraft direction of flight could include data representative of heading of ground track.

The flowchart continues with module 208 with the determining of the terrain threat associated with each terrain cell by the terrain image processor 130. The terrain image processor 130 may assign each terrain a parameter associated with a level of terrain. The flowchart continues with module 210 with the providing of terrain image data to the terrain indicating system 140. The terrain image processor 130 could develop a set of terrain image data which corresponds to the location of each level of threat or parameter and provide this set of terrain image data to the terrain indicating system 140. The terrain image processor 130 could provide terrain symbol information associated with each terrain threat level. The flowchart continues with module 212 with the presenting of substantially transparent terrain symbols representative of the terrain image data on a display unit of the indicating system. In one embodiment, the terrain symbols could be visually distinct from one another. In another embodiment, the terrain symbols could be presented on a display unit depicting either colored or monochrome screen images. In another embodiment, the presentation of colors correspond with the alert coloring format used in a terrain awareness and warning system include red for warning alerts and amber for caution alerts. In another embodiment, the terrain symbols could be substantially transparent which overlay information provided to the display system by another aircraft system. In another embodiment, the display unit of the terrain indicating system 140 may be a strategic display unit. In another embodiment, the display unit could be the same display unit which depicts weather information. Then, the flowchart proceeds to the end.

It should be noted that the method steps described above are embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting an image of terrain on a display unit of an aircraft, said system comprising:
   a navigation system for acquiring navigation data representative of aircraft position, aircraft altitude, and direction of flight;
   a terrain database storing terrain data comprised of a plurality of terrain cells, wherein each terrain cell comprises data representative of the highest elevation and location of such terrain cell;

a terrain image processor, electronically coupled to receive the navigation data and the terrain data, where such processor receives the navigation data, defines at least one range of terrain elevations based upon the aircraft altitude, wherein each range of terrain elevations is associated with one terrain threat level, and each terrain threat level is associated with a range of aircraft altitudes, retrieves terrain data from the terrain database based upon each defined range of terrain elevations, the aircraft position, and the direction of flight, where the retrieval of such terrain data is limited to each terrain cell located in front of the aircraft in which the highest elevation falls within any of the defined range or ranges of terrain elevations, determines the terrain threat level associated with each terrain cell of the retrieved terrain data, and provides terrain image data to an indicating system, where such terrain image data is representative of the location and the terrain threat level associated with each terrain cell of the retrieved terrain data; and the indicating system, electronically coupled to receive the terrain image data, where such system receives the terrain image data, and presents at least one terrain symbol representative of the terrain image data on a display unit, such that each terrain symbol is an identically-shaped closed shape representative of a single terrain threat level, where at least one terrain threat level is represented by a transparent terrain symbol, and the entire perimeter of each closed shape is visually-delineated, where such visual delineation is maintained when contiguous terrain cells are presented.

2. The system of claim 1, wherein the direction of flight includes data representative of heading or ground track.

3. The system of claim 1, wherein the range of aircraft altitudes is configurable by a user.

4. The system of claim 1, wherein two terrain threat levels are represented by transparent terrain symbols, or three terrain threat levels are represented by transparent terrain symbols.

5. The system of claim 1, wherein the terrain symbols are presented in color or monochrome.

6. The system of claim 5, wherein the color of each terrain cell corresponds with an alert coloring format used in a terrain awareness and warning system, such that red is indicative of a warning alert and amber is indicative of a caution alert.

7. The system of claim 1, wherein each terrain symbol overlays information provided by at least one other aircraft system when presented on the display unit.

8. The system of claim 1, wherein the display unit is a strategic display unit.

9. The system of claim 8, wherein the strategic display unit presents weather information.

10. A method for presenting an image of terrain on a display unit of an aircraft, said method comprising:

using a terrain image processor to perform the following steps:

receiving navigation data representative of aircraft position, aircraft altitude, and direction of flight from a navigation system;

defining at least one range of terrain elevations based upon the aircraft altitude, wherein each range of terrain elevations is associated with one terrain threat level, and each terrain threat level is associated with a range of aircraft altitudes;

retrieving terrain data based upon each defined range of terrain elevations, the aircraft position, and the direction of flight, where the retrieval of such terrain data is limited to each terrain cell located in front of the aircraft in which the highest elevation falls within any of the defined range or ranges of terrain elevations, wherein the terrain data is retrieved from a terrain database storing terrain data comprised of a plurality of terrain cells, wherein each terrain cell comprises data representative of the highest elevation and location of such terrain cell;

determining the terrain threat level associated with each terrain cell of the retrieved terrain data; and providing terrain image data to an indicating system, where such terrain image data is representative of the location and the terrain threat level associated with each terrain cell of the retrieved terrain data, whereby at least one terrain symbol representative of the terrain image data is presented on a display unit, such that each terrain symbol is an identically-shaped closed shape representative of a single terrain threat level, where at least one terrain threat level is represented by a transparent terrain symbol, and the entire perimeter of each closed shape is visually-delineated, where such visual delineation is maintained when contiguous terrain cells are presented.

11. The method of claim 10, wherein the direction of flight includes data representative of heading or ground track.

12. The method of claim 10, wherein the range of aircraft altitudes is configurable by a user.

13. The method of claim 10, wherein two terrain threat levels are represented by transparent terrain symbols, or three terrain threat levels are represented by transparent terrain symbols.

14. The method of claim 10, wherein the terrain symbols are presented in color or monochrome.

15. The method of claim 14, wherein the color of each terrain cell corresponds with an alert coloring format used in a terrain awareness and warning system, such that red is indicative of a warning alert and amber is indicative of a caution alert.

16. The method of claim 10, wherein the presentation of each terrain symbol overlays information provided by at least one other aircraft system when presented on the display unit.

17. The method of claim 10, wherein the display unit is a strategic display unit.

18. The method of claim 17, wherein the strategic display unit presents weather information.

* * * * *